United States Patent [19]
Eliason

[11] 3,774,281
[45] Nov. 27, 1973

[54] METHOD OF INSULATING A PIPELINE

[75] Inventor: Kay E. Eliason, Fort Madison, Iowa

[73] Assignee: Atlantic Richfield Company, New York, N.Y.

[22] Filed: Nov. 8, 1971

[21] Appl. No.: 196,630

[52] U.S. Cl.................. 29/157 R, 29/509, 248/49
[51] Int. Cl............................................. B21d 53/00
[58] Field of Search...................... 29/157 R, 509; 248/49; 264/45

[56] References Cited
UNITED STATES PATENTS

| | | | |
|---|---|---|---|
| 3,222,777 | 12/1965 | Rutter et al. | 29/157 R X |
| 3,010,199 | 11/1961 | Smith et al. | 29/509 |
| 2,857,931 | 10/1958 | Lawton | 264/45 X |
| 3,563,503 | 2/1971 | Lancaster | 248/49 |
| 3,642,308 | 2/1972 | Zeile et al. | 248/49 X |
| 3,026,076 | 3/1962 | Bender | 248/49 |
| 3,359,351 | 12/1967 | Bender | 264/45 |
| 3,613,380 | 10/1971 | Tarner | 248/49 X |
| 3,648,468 | 3/1972 | Bowers | 248/49 X |
| 3,729,880 | 5/1973 | Eliason | 264/45 X |

Primary Examiner—Charles W. Lanham
Assistant Examiner—D. C. Reiley, III
Attorney—John C. Martin, Jr. et al.

[57] ABSTRACT

An insulating section and a method for insulating a length of pipe in northern regions subsequent to installation of the pipe is provided by a prefabricated pipe insulation system comprising (a) forming a cylindrical metallic outer jacket longitudinally flanged for seaming, (b) applying a layer of synthetic insulating foam to the interior of the outer jacket thereby forming insulating sections of insulating material adhering to an outer jacket, (c) placing said sections end-to-end longitudinally and circumferentially along the length of pipe, (d) providing batten straps, adaptable to mating with the longitudinal seam, around the pipe circumference and extending between adjacent seams of insulating sections, and (e) securing the insulating section against the pipe and the circumferential battens by forming the longitudinal seam which incorporates the battens. The pipe insulating system provides a means of forming pipe insulation sections in a mobile unit near the pipe location and is particularly applicable in northern regions to insulate newly laid or existing pipelines.

8 Claims, 10 Drawing Figures

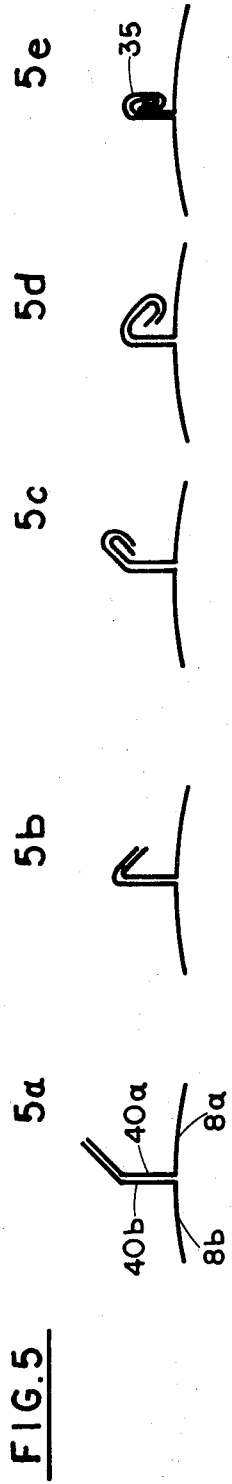
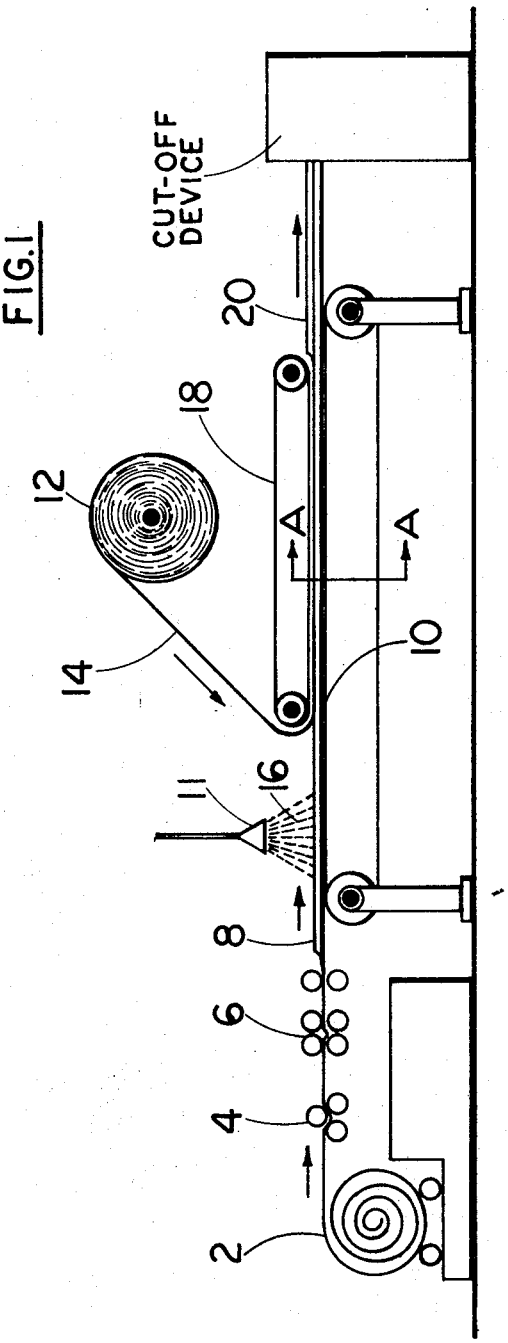

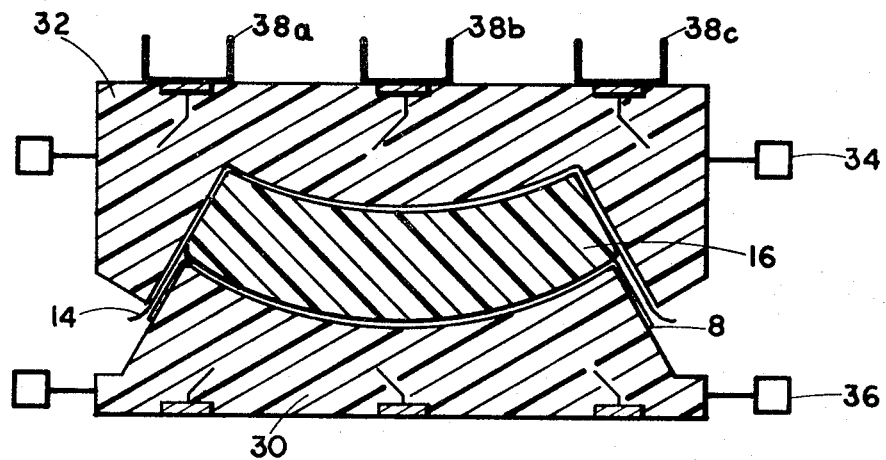
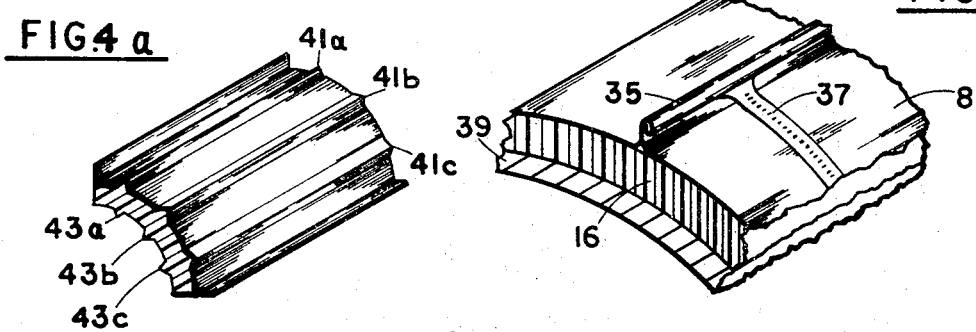
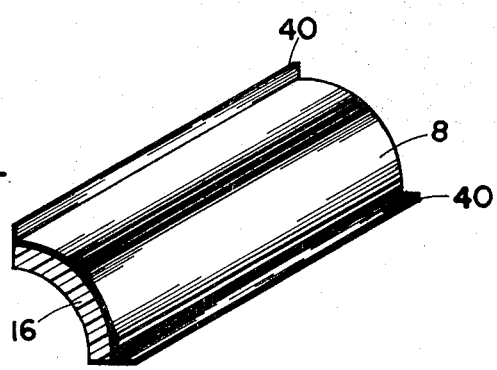
INVENTOR
KAY E. ELIASON

METHOD OF INSULATING A PIPELINE

BACKGROUND OF THE INVENTION

Economic activity in northern regions, particularly in the Arctic environment has been stimulated by discovery of underground natural resources such as oil and gas reserves. Recovery of these resources and their transportation to a suitable site for further processing or transporting may require installation of various pipelines. Although pipelines in more temperate zones are generally placed underground, pipeline construction in northern regions wherein a permafrost condition typically prevails may require in part construction of an above-ground pipeline on high moisture content permafrost areas so that the pipeline is substantially free from adverse environmental effects and other dangers such as subsidence and erosion caused by thawing of frozen substrata. Thus construction of an above ground pipeline in an Arctic environment requires development and application of additional technology in the field of pipeline insulation.

In northern regions pipeline insulation for an above ground pipeline must be capable of withstanding a wide range of temperatures that will vary from up to +180°F. within the pipe to −70°F. or lower ambient air temperatures. The design of the entire pipeline insulating system must achieve substantial flexibility to compensate for the temperature differentials between the internal heat of the fluid carried by the pipeline and the ambient conditions.

The pipeline insulation requires protection from damage by impact both during and after installation that may be caused by construction, indigenous animal life and accidental or malicious blows by persons and/or equipment that could injure insulation without significant impact resistance. If the pipeline is above ground, the insulation system must be capable of withstanding the deleterious effect of ultraviolet light and other potentially damaging rays transmitted by the atmosphere. An acceptable pipeline for the Arctic environment must be capable of economical installation in a sub-freezing environment and provide a system minimizing transportation costs for components of the pipeline insulation system. Furthermore, the insulation system should be capable of visual quality control to ensure substantially uniform distribution of the insulating material in such a manner that undesirable voids in the insulation are easily detected. In addition, it is desirable that any breakage in a pipeline be easily capable of detection by electronic or visual means.

Various methods of insulating pipelines are known and include such methods as wrapping the pipeline with an asbestos-type material, applying a layer of insulating material such as a foam, or forming a mold around a pipe circumference to create an annular space that is filled with an expandable insulating foam. The latter method creates the problem of establishing proper quality control in that it is extremely difficult to determine whether the annular space is filled with insulating foam and satisfactorily void-free. Merely placing an insulating layer around a pipeline may expose the insulating layer to degradation by ultraviolet rays and provides an insulation having only minor impact resistance. Similarly, a pipeline wrapped with asbestos-like material is susceptible to deterioration.

Therefore, a pipeline insulating system that is economic and practical to install in low temperature environments, that resists deterioration caused by exposure to the atmosphere, and that provides impact resistance is desirable for an above ground pipeline in northern regions.

SUMMARY OF THE INVENTION

It is an object of this invention to provide prefabricated insulating sections for a length of pipe, particularly in northern regions such as the Arctic and sub-Arctic. It is a further object of this invention to provide an insulating section capable of being produced at an on-site location near the pipeline to be insulated. Still another object of this invention is to provide an economic and simplified method of insulating a pipeline in northern regions. Another object of this invention is to provide a pipeline insulation system that will be generally resistant to damage by impact and resistant to the degradative effect of ultraviolet light as well as being able to survive the deleterious effects of a low temperature environment. A still further object of this invention is to provide a means of insulating an above-ground pipeline. Still another object of this invention is to provide a method of insulating a length of pipe wherein the insulation is easily susceptible to quality control.

These and other objects of the invention are accomplished by providing a cylindrical prefabricated insulation section for insulating a length of pipe wherein each insulating section has a cylindrical outer jacket having an arc of 180° or less and longitudinally flanged for seaming with a layer of insulating foam adhering to the interior surface of the outer jacket. The method for insulating the length of pipe comprises forming the prefabricated insulating section having a cylindrical metallic outer jacket longitudinally flanged for seaming and a layer of synthetic insulating foam adhering to the interior surface of the outer jacket, thereafter placing the insulating sections in an end-to-end arrangement longitudinally and circumferentially along the length of pipe to be insulated, applying coupling means for the sections around the pipe circumference and extending between adjacent circumferential seams of the insulating sections, and finally securing the insulating sections against the pipe by longitudinal seaming of the paired flanges wherein the circumferential coupling battens are incorporated within the longitudinal flange seams at the intersections.

DESCRIPTION OF THE INVENTION

The advantages of the invention will become more apparent from the following description considered in conjunction with the accompanying drawings wherein:

FIG. 1 is a perspective view of an assembly line system for forming prefabricated insulating sections;

FIG. 2 is a fragmentary end view taken along line A—A of FIG. 1 illustrating the molds for forming the insulating sections;

FIG. 3 is a fragmentary perspective view of an installed prefabricated insulation system having compatible coupling means for circumferential and longitudinal joining;

FIGS. 4 and 4(a) are perspective views of prefabricated insulating section quadrants; and FIGS. 5(a), 5(b), 5(c), 5(d), and 5(e) are perspective views showing sequential steps in longitudinal seaming.

Referring now in greater detail to the various views of the drawings, FIG. 1 illustrates an assembly line for forming the prefabricated insulating sections having sheet metal supply roll 2 representing a supply of metallic outer jacket material that is fed to straightening rolls 4 and delivered to forming rolls 6 that set the curvature of outer jacket 8 to a cylindrically shaped contour and provide flanges along both longitudinal edges. Outer jacket support conveyor 10 moves the outer jacket to a position beneath foam mixing spray head(s) 11 wherein synthetic foam layer 16, such as a polyurethane, is applied to the interior surface of the outer jacket so that the foam covers the entire curved surface that will embrace the pipe to be insulated. As foam layer 16 rises, caused by foam formation, outer jacket support conveyor 10 moves under upper form conveyor 18 wherein sheet supply roll 12 feeds a sheet that serves as a mold release material between rising polyurethane foam layer 16 and upper form conveyor 18. Thereafter, the continuous length of insulating section 20 moves to a cut off area wherein lengths of prefabricated insulating section are cut at desired intervals.

Depending upon the nature and desired physical properties of the outer metallic jacket, any sheet metal material may be employed; preferred materials include aluminum, galvanized carbon steel, prepainted carbon steel, galvanized and prepainted carbon steel, and stainless steel.

Although the preferred synthetic foam material is a polyurethane suitable for use in a low temperature environment, other synthetic resin materials useful in low temperature environments may also be employed.

Sheet material 14 provides a mold release means between the upper die and the foamed insulating material. In addition, the sheet provides a protective shield for the foam layer of the insulating section that is useful during any required transit to the installation site and subsequent handling from the time the insulating section is formed until installation. As sheet material, various thermoplastic synthetic polymeric materials may be employed including polyolefin sheets such as polyethylene and polypropylene as well as vinyl chloride sheets. Alternatively, conventional mold release agents may be applied to the upper die in lieu of the synthetic polymeric sheet.

The pipe insulating system of this invention comprises a plurality of insulating sections installed circumferentially to the pipe, and longitudinally as desired, wherein the individual insulating sections are cylindrical in shape having an arc of 180° or less. Thus each insulating section may be semi-cylindrical, having an arc of 180°, so that two sections surround the pipe or three or four insulating sections may circumferentially cover the pipeline, thus each section would have an arc of 120° or 90°, respectively. The desired circumferential arc of the insulating section will usually depend upon the size of the pipeline to be insulated. For instance, a pipeline of 48 inches in diameter may be insulated by insulating section quadrants wherein each section forms an arc of 90°. A 36 inch pipeline may be insulated using three 120° sections and an 18 inch or smaller pipeline may be insulated with semi-cylindrical sections.

The particular longitudinal length of the insulating section likewise may be selected as desired by those prefabricating and/or installing the pipeline. Usually, the factors determining longitudinal length will be ease of handling and available manpower to install the pipeline insulation. As an example, the longitudinal length of the insulating sections may vary from about 4 feet to 30 feet or more in length, but generally would be from about 6 feet to 20 feet or more for ease of handling.

Spray head 11 emits the foam components for providing the insulating layer. For purposes of illustration, only one spray head appears in FIG. 1, but a plurality of spray heads may be desirable for the larger insulating sections. If a polyurethane foam is desired, the polyol, catalyst and polyisocyanate components together with any necessary blowing agent and other optional additives will be fed through lines into mixing head 11, as is conventional in the art, wherein the components will be mixed and dispensed through the spray head.

The thickness of the insulating layer is dependent upon environmental conditions as well as the desired physical characteristics to be imparted to the insulated pipeline. For instance, in a 48 inch diameter pipeline, the thickness of the insulating layer may be as much as four inches or more but can vary depending upon the aforementioned factors.

FIG. 2 is a fragmentary end view of the insulating section assembly line taken along line A—A of FIG. 1 illustrating formation of an insulating section quadrant having outer jacket 8 adhering to foam insulation layer 16 wherein sheet 14, preferably of polyethylene, provides mold release means between foam insulation layer 16 and upper die 32 that may be of cast polyurethane. Since outer jacket 8 is metallic, mold release means between lower die 30 and the outer jacket are generally unnecessary. Upper die 32 is provided with upper drive chain 34 to move the die and pressure bars 38a, 38b, and 38c provide the requisite mold forming means to shape the insulation section. Lower die 30 is moved by lower drive chain 36. The dies may be formed from cast polyurethane to provide a relatively inexpensive die, since the shape will be periodically altered depending upon the diameter and contour of the pipeline to be insulated, however, other conventionally used materials may be employed.

The assembly line for forming the pipe insulating sections illustrated in FIG. 1 may be adjusted to operate at any normal linear speed but generally a speed in the range of about 5 to 10 linear feet per minute will be satisfactory.

After inspection of the prefabricated pipe insulating sections to insure that the foam insulation is essentially uniformly distributed and is otherwise satisfactory, the sections are transported to the pipeline site for installation where they are placed end-to-end longitudinally and circumferentially along the length of pipe desired to be insulated.

FIG. 3 illustrates a view of the circumferential coupling mated with a horizontal standing seam. Batten straps for circumferential joining will generally be of thin gauge metal and may be attached to the outer jacket flange by clips or other suitable means. It is desirable to avoid exposing raw edges of metal to the environment since direct exposure to the atmosphere promotes deterioration of the metal; therefore, the edge of the batten strap that would be exposed circumferentially surrounding the insulating sections may be folded back 180°. Exposure of metal edges along the longitudinal length of the insulated pipeline is avoided by the method of forming the longitudinal seam which is preferably a double standing rib seam. If desired, a sponge gasket may be placed between the batten strap and outer jacket. The batten strap is adaptable to mating with the longitudinal seam to form an integral joint as illustrated in FIG. 3 showing a fragmentary view of the insulated pipe wherein foam insulation 16 is sandwiched between pipe 39 and outer jacket 8. Batten strap 37 mates with longitudinal double fold standing seam 35 to form an integral joining means.

FIG. 4 illustrates a perspective view of an insulating section quadrant for insulating a pipeline 48 inches in diameter comprising foam insulation layer 16 adhering to outer jacket 8 to form a cylindrical laminate quadrant section having flange 40 sufficiently wide to provide adequate metal to form the double fold standing seam, wherein the flange generally extends about one to three inches and preferably about one and one-half inches from the base of outer jacket 8 and being substantially perpendicular to the surface of the outer jacket.

FIG. 4(a) is a perspective view of another embodiment of a prefabricated insulating section quadrant having outer jacket 8, longitudinal flanges 40 and insulating layer 16 wherein independently spaced longitudinal ribs 41(a), 41(b), and 41(c) extend the length of the prefabricated insulating section and are generally parallel to each other and the longitudinal edges of the section. A ribbed outer metallic jacket provides additional strength for the installed insulation sections and the ribs are formed by conventional means. Spaced crush strips 43(a), 43(b), and 43(c) positioned on insulating layer 16 extend longitudinally the length of the section at spaced intervals and are generally parallel to each other and the longitudinal edges. The optional crush strips may be formed in a mold of the type shown in FIG. 2 by designing the mold to provide for formation of the strips during the forming step. Since the insulating section is principally intended for insulating pipelines in Arctic and sub-Arctic regions wherein the pipelines may possess certain structural or design irregularities, crush strips that may outwardly protrude from one-sixteenth inch to one-half inch, depending upon the size of the pipe to be insulated, compensate for these irregularities by physically deforming during longitudinally and circumferentially securing and therefore aid in obtaining a secure fitting of the insulating section against the pipeline.

FIGS. 5(a), 5(b), 5(c), 5(d) and 5(e) illustrate formation of the longitudinal double fold standing rib seam at sequential steps wherein the seam is formed by a seaming tool having a plurality of rolls wherein the rolls rotate the abutting flanges. In a nine roll seamer wherein the first roll is a power drive roll, each of the remaining eight rolls rotate the flanges in increments of 45° to provide a double fold standing seam. The second roll (first rotating roll) turns the upper half of the abutting flanges 45°, the third roll rotates the flanges an additional 45° so that the upper half of the flanges are essentially parallel to the outer jacket having been turned 90° and rolls four to nine continue this process to completion of the second fold. Rolls four and five complete the first fold and rolls six to nine form the second fold. Rolls six to nine function in a similar manner to rolls two to five in that each of the rolls turn the flanges an additional 45°. After completion of the double fold standing rib seam, no metal edges are exposed to the atmosphere and thus the seam is corrosion resistant.

FIG. 5(a) illustrates longitudinally abutting insulating sections having outer jackets 8(a) and 8(b) and longitudinal flanges 40(a) and 40(b) perpendicular to the outer jacket surface. FIG. 5(b) illustrates the position of the flanges after the upper portions are rolled 135°. FIG. 5(c) indicates the position of the flanges after roll six, the beginning of forming the second fold. FIG. 5(d) illustrates the flange position after roll eight wherein the second fold is continuing to be formed. FIG. 5(e) illustrates the final position of the completed second fold wherein double standing rib seam 35 secures the circumferential battens against the pipe insulating sections and additionally obviates any direct exposure of raw metal edges.

In one embodiment of the invention a pipeline 48 inches in diameter is insulated by the pipe insulation system of this invention by placing prefabricated insulating section quadrants circumferentially to the pipe exterior wherein each quadrant is approximately 15 feet in length. The prefabricated insulation sections are formed in an assembly line wherein a supply of thin gauge galvanized carbon steel, unwound from an outer jacket supply roll, passes between straightening rolls and through quadrant forming rolls wherein the interior of the outer jacket is exposed to a polyurethane foam spray head ejecting an amount of polyurethane foam to provide an insulation thickness of about four inches. If desired, the metal outer jacket may be ribbed or beaded to provide additional strength for the installed insulated sections. The particular rigid polyurethane foam is designed for low temperature applications and is prepared from polyol and polyisocyanate components using trichlorofluoromethane, in an amount of about 2 per cent by volume, as the blowing agent.

The polyurethane foam has three physical properties: A thermoconductivity of 0.13 BTU/Hr./Ft.$^2$/°F./In. (k factor at 77°F. as determined by ASTM–D–2326–64T using the probe method), a compressive strength of 23 psi (5percent deflection as determined by AST-M–D–1621–64), a water absorption of 35 gms/1,000 cm$^3$ (as determined by ASTM–D–1217–62T) and an overall density of 2.7 lbs./ft.$^3$ (as determined by AST-M–D–1622–63). Mold release means between the urethane foam and the upper die is provided by polyethylene film that also serves to protect the foam surface from minor abrasions or other damage that may occur between the time of foam formation and time of installing the individual sections. The assembly line for the insulating sections then moves the continuously formed pipe insulation to a cut-off area. The insulating quadrants are then installed end-to-end, circumferentially and longitudinally, and joined by aforementioned means. During installation of the sections temporary holding straps will be used while the circumferential battens are installed.

Although the sections may be placed against the pipe to be insulated so that the longitudinal lengths are coextensive thus forming a continuous circumferential seam around the pipe, it is generally preferable to employ a staggered circumferential joint design thus forming a discontinuous circumferential seam that provides additional strength for the installed insulation sections. Large diameter pipeline insulation by the aforementioned insulating sections may be economically installed even in low temperature environments. Since the sections are relatively easy to install, installation may be accomplished even in sub-freezing temperatures by providing temporary cover for the word area to protect the installers from environmental conditions. The metallic outer jacket is resistant to deterioration caused by exposure to the atmosphere and provides an impact resistant outer covering that is resistant to degradation by ultraviolet rays.

While the preferred embodiments of the invention have been illustrated and described, it is to be understood that modifications may be made within the scope of the appended claims without departing from the spirit of the invention.

We claim:

1. A method for insulating a length of pipe subsequent to installation of the pipe comprising
    a. Forming insulation sections in the shape of annular segments having (1) metallic outer jackets whose cross sections form circular arcs terminated in radially outwardly extending portions to form longitudinal flanges and (2) layers of synthetic insulating foam adhering to the interior surface of said outer jackets, the radial edges of said foam lying in the plane of the flanges,
    b. Placing said sections end-to-end longitudinally and side-to-side circumferentially along the length of pipe to form a continuous layer of insulation over the pipe with the flanges of circumferentially adjacent segments facing each other and in continuous relationship to form longitudinal seams,
    c. Placing coupling means for longitudinally adjacent sections along the pipe circumference extending over the circumferential seams formed by the abutment of the longitudinally adjacent sections, and
    d. Securing the circumferentially adjacent sections against the pipe by folding together each of the pairs of longitudinal flanges to form double fold standing rib seams having no exposed metal edges.

2. A method according to claim 1 wherein said coupling means are batten straps adaptable to mating with the longitudinal seam.

3. A method according to claim 1 wherein the cylindrical surface of said section forms an arc of 180° or less.

4. A method according to claim 1 wherein said arc is between about 90° and 180°.

5. A method according to claim 1 wherein said outer jacket is selected from group consisting of aluminum, carbon steel, and stainless steel.

6. A method according to claim 1 wherein said synthetic insulating foam is a polyurethane.

7. A method according to claim 2 wherein a sponge-type gasket is provided between the batten strap and the metallic outer jacket.

8. The method of claim 2 wherein the edges of the batten strips are folded under 180°.

* * * * *